United States Patent
Iacoletti et al.

(10) Patent No.: US 11,782,887 B1
(45) Date of Patent: *Oct. 10, 2023

(54) GENERATING CONFIGURATION FILES

(71) Applicant: United Services Automobile Association (USAA), San Antonio, TX (US)

(72) Inventors: Paul Iacoletti, San Antonio, TX (US); Derek LeBlanc, San Antonio, TX (US); Kevin Orey, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 433 days.

This patent is subject to a terminal disclaimer.

(21) Appl. No.: 16/986,668

(22) Filed: Aug. 6, 2020

Related U.S. Application Data

(63) Continuation of application No. 14/272,791, filed on May 8, 2014, now Pat. No. 10,783,123.

(51) Int. Cl.
  *G06F 16/21* (2019.01)
(52) U.S. Cl.
  CPC ................. *G06F 16/211* (2019.01)
(58) Field of Classification Search
  CPC .................................................. G06F 16/211
  USPC .......................................................... 707/805
  See application file for complete search history.

(56) References Cited

U.S. PATENT DOCUMENTS

| | | | | |
|---|---|---|---|---|
| 2005/0138558 A1* | 6/2005 | Duevel | ............... | G06F 9/44505 715/700 |
| 2005/0149626 A1* | 7/2005 | Manchester | ........ | H04W 12/033 709/220 |
| 2006/0212477 A1* | 9/2006 | Murphy | ................ | G06F 16/283 |
| 2006/0259499 A1* | 11/2006 | Moulckers | ............ | G06F 40/186 715/764 |
| 2006/0259949 A1* | 11/2006 | Schaefer | ............... | G06F 16/122 726/1 |
| 2009/0282067 A1* | 11/2009 | Bendigeri | ............ | G05B 19/042 717/136 |
| 2009/0300049 A1* | 12/2009 | Zhang | ..................... | G06F 21/57 707/999.102 |
| 2010/0274813 A1* | 10/2010 | Lu | ......................... | G06F 16/252 707/792 |
| 2010/0306285 A1* | 12/2010 | Shah | ..................... | G06F 40/211 707/E17.005 |
| 2012/0197973 A1* | 8/2012 | Tukol | .................... | G06F 9/4451 709/203 |
| 2012/0198218 A1* | 8/2012 | Tukol | ..................... | G06F 8/658 713/1 |

(Continued)

*Primary Examiner* — Hosain T Alam
*Assistant Examiner* — Nicholas E Allen
(74) *Attorney, Agent, or Firm* — Fish & Richardson P.C.

(57) ABSTRACT

Methods, systems, and apparatus, including computer programs encoded on computer storage media, for generating configuration files. One of the methods includes presenting a plurality of configuration types to a user, each configuration type associated with a schema. The methods include the actions of receiving a selection of a configuration type. The method includes presenting a user interface to the user, the user interface including a plurality of fields, at least some of the fields corresponding attributes of the schema. The method includes receiving a plurality of values. The method includes generating a configuration file based on the plurality of values and the schema.

15 Claims, 6 Drawing Sheets

(56) References Cited

U.S. PATENT DOCUMENTS

| | | | | |
|---|---|---|---|---|
| 2012/0198222 A1* | 8/2012 | Tukol | ................ | H04L 61/5061 |
| | | | | 713/2 |
| 2012/0311524 A1* | 12/2012 | Chen | ........................ | G06F 8/10 |
| | | | | 717/104 |
| 2013/0268920 A1* | 10/2013 | Ursal | ....................... | G06F 8/70 |
| | | | | 717/131 |
| 2013/0325907 A1* | 12/2013 | Montes de Oca | ...... | G06F 16/84 |
| | | | | 707/811 |
| 2013/0346260 A1* | 12/2013 | Jubran | ................ | G06Q 10/087 |
| | | | | 705/28 |
| 2014/0130119 A1 | 5/2014 | Goldschlag | | |

* cited by examiner

| | | |
|---|---|---|
| Config Type: | DataSource | ← 402 |
| Auth Data Alias | dbclosdb | ← 404 |
| Auth Mechanism | Basic Password ▽ | ← 406 |
| Container Persistence | ☐ | ← 408 |
| Data source Helper | com.ibm.websphere.rsadap▽ | ← 410 |
| Description | Data source for product data | ← 412 |
| JNDI Name | jdbc/BkLoanProduct.v5 | ← 414 |
| Name | BkLoanProduct.v5 | ← 416 |
| JDBC Provider | Non XA DB2 Universal JDBC | ← 418 |
| Use JAASAuth? | No ▽ | ← 420 |
| Max Connections: | 10 | ← 422 |
| Database Name | databaseName | ← 426 |
| Driver Type | driverType | ← 428 |
| Server Name | serverName | ← 430 |

432 → Submit

Fig. 4

```xml
<xs:element name="db2">                    ← 502
  <xs:complexType>
    <xs:sequence>
      <xs:element ref="node"/>                       500
      <xs:element ref="db"/>
      <xs:element ref="dcs"/>
      <xs:element ref="changeLog"/>
    </xs:sequence>
  </xs:complexType>              504
</xs:element>
<xs:element name="DataSource">
  <xs:complexType>
    <xs:sequence>
      <xs:element name="scope" type="xs:string"/>    506
      <xs:element ref="connectionPool"/>  ←
      <xs:element ref="propertySet"/>
      <xs:element ref="mapping"/>                         514
      <xs:element ref="changeLog"/>                              508
    </xs:sequence>
    <xs:attribute name="datasourceHelperClassname" type="xs:string"/>
    <xs:attribute name="provider" type="xs:string"/>
    <xs:attribute name="containerManagedPersistence" type="xs:string"/>
    <xs:attribute name="statementCacheSize" type="xs:string"/>
    <xs:attribute name="jndiName" type="xs:string"/>
    <xs:attribute name="name" type="xs:string"/>
    <xs:attribute name="description" type="xs:string"/>
    <xs:attribute name="authMechanismPreference" type="xs:string"/>
    <xs:attribute name="authDataAlias" type="xs:string"/>
  </xs:complexType>                510
</xs:element>                            516
  <xs:element name="connectionPool">                 512
  <xs:complexType>
    <xs:attribute name="maxConnections" type="xs:int"/>
    <xs:attribute name="minConnections" type="xs:int"/>
    <xs:attribute name="connectionTimeout" type="xs:int"/>
    <xs:attribute name="unusedTimeout" type="xs:int"/>
    <xs:attribute name="agedTimeout" type="xs:int"/>
    <xs:attribute name="purgePolicy" type="xs:string"/>
    <xs:attribute name="reapTime" type="xs:int"/>
  </xs:complexType>
</xs:element>
```

FIG. 5

```xml
<?xml version="1.0" encoding="UTF-8" ?>
<DataSource authDataAlias="dbclosdb" authMechanismPreference="BASIC_PASSWORD" containerManagedPersistence="false" datasourceHelperClassname="com.ibm.websphere.rsadapter.DB2UniversalDataStoreHelper" description="Datasource for BANK product data." jndiName="jdbc/BkLoanProduct.v5" name="BKLoanProduct.v5" provider="Non XA DB2 Universal JDBC Driver Provider" statementCacheSize="10">
    <scope>cell</scope>
    <connectionPool agedTimeout="0" connectionTimeout="5" maxConnections="10" minConnections="0" purgePolicy="EntirePool" reapTime="180" unusedTimeout="1800" />
    <propertySet>
        <resourceProperties description="" name="databaseName" required="true" type="java.lang.String" value="DBCLOSDB" />
        <resourceProperties description="" name="driverType" required="true" type="java.lang.Integer" value="4" />
        <resourceProperties description="" name="serverName" required="false" type="java.lang.String" value="produdbclosdb2" />
    </propertySet>
    <mapping authDataAlias="dbclosdb" mappingConfigAlias="DefaultPrincipalMapping" />
</DataSource>
```

FIG. 6

GENERATING CONFIGURATION FILES

CROSS-REFERENCE TO RELATED APPLICATIONS

This application is a continuation application of and claims priority under 35 U.S.C. § 120 to U.S. application Ser. No. 14/272,791, filed on May 8, 2014, the entire contents of which is incorporated herein by reference.

BACKGROUND

Configuration files configure the settings for some computer programs. They are used for user applications, database configuration, and other server processes. The configuration files may be flat files with each configuration value terminated by a new line. Configuration files can also be structured documents (for example, Extensible Markup language documents (XML)) when the configuration values are defined by a predetermined structure. Some configuration files are order dependent (for example, specific parameter values need to be located in particular places) or may be order independent (for example, parameter values may occur anywhere in the configuration file).

SUMMARY

In some aspects, methods that include the actions of presenting a plurality of configuration types to a user, with each configuration type being associated with a schema are described herein. The methods include the actions of receiving a selection of a configuration type. The methods can include the actions of presenting a user interface to the user where the user interface includes a plurality of fields, with at least some of the fields corresponding attributes of the schema. The methods may also include the actions of receiving a plurality of values. The methods additionally include the actions of generating a configuration file based on the plurality of values and the schema.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination installed on the system that, in operation, causes the system to perform the actions. One or more computer programs can be configured to perform particular actions by virtue of including instructions that, when executed by a data processing apparatus, cause the apparatus to perform the designated actions.

The foregoing and other embodiments can each optionally include one or more of the following features, alone or in combination. The methods may include the actions of adding a configuration file to a source code management system. The methods may include the actions of distributing the configuration file to a plurality of computer systems. The methods may include the actions of validating the plurality of values based on the schema. Generating the configuration file may include identifying a plurality of elements in the schema, each element including attributes, identifying an attribute corresponding to a value, and adding the value to a configuration file associated with the attribute. The schema may define a structure of the configuration file and a data type for values in the configuration file. The methods may include the actions of obtaining a stored configuration file. The methods may include the actions of presenting a second user interface to the user, the second user interface including a second plurality of fields, at least some of the plurality of fields populated based on values in the stored configuration file. The methods may include the actions of receiving an update to a value in a field of the second user interface. The methods may include the actions of updating the stored configuration file based on the updated value.

BRIEF DESCRIPTION OF THE DRAWINGS

FIG. 4 illustrates an exemplary user interface for providing data for a configuration file.

FIG. 5 illustrates an example of an XML schema definition.

FIG. 6 is an exemplary configuration file generated using a user interface and a schema.

Like reference numbers and designations in the various drawings indicate like elements.

DETAILED DESCRIPTION

The generation and maintenance of configuration files often requires specialized knowledge. As such, the configuration files for each application, database, and server process may include its own structure. Furthermore, as many configuration files allow for a degree of flexibility in how the structure is defined, users can create functionally identical but structurally distinct configuration files. Structural differences between otherwise identical configuration files can increase the complexity of maintaining the configuration files and can increase the associated cost.

A user interface tool can be used to simplify the creation and maintenance of configuration files. The tool provides a self-service interface that guides users to create configuration files. The user interface guides the user through a set of questions and generates the configuration files based on their answers given. For example, the user interface can be used to generate J2EE application configuration files.

The newly created configuration files can be checked into a source code repository and made ready to be distributed to various servers. In general, a source code repository is used to track and control changes to software. The source code repository may include a version control system. Once added to the repository, changes to the files are tracked and managed. This gives system administrators another way to easily track changes made and a way to roll back to earlier versions should the need arise.

Because these configuration files are complex, the creation of the files is error-prone. While XML provides flexibility in how these files are created, that flexibility can also introduce complexities in the creation and management of the configuration file. Each individual developer is likely to create distinct configuration files which do not conform to any enterprise standard. The tools described below addresses these issues.

Figure 1:
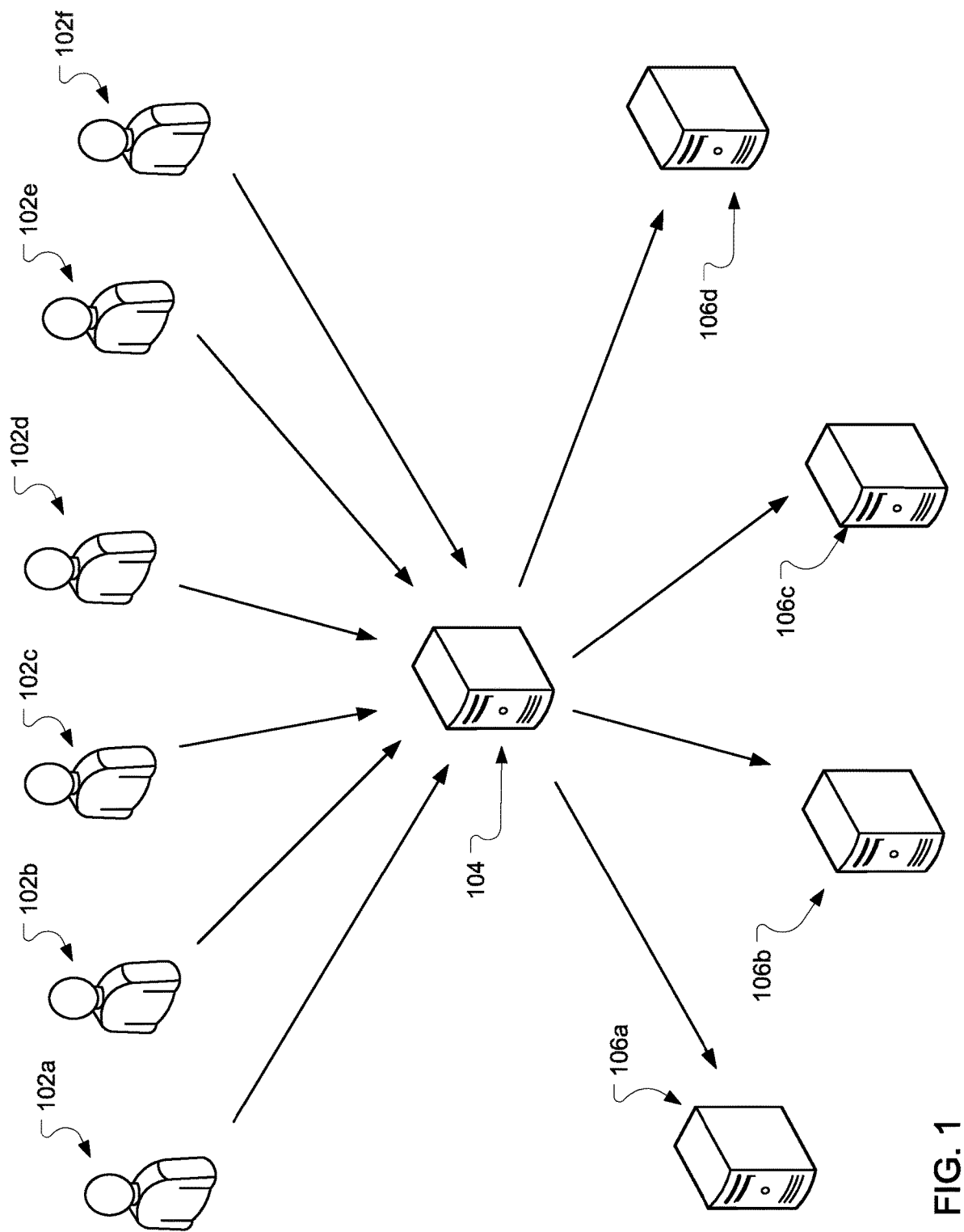
FIG. 1 illustrates an example system for creating and distributing configuration files.

FIG. 1 illustrates an example system for creating and distributing configuration files. The creation and management of configuration files can be simplified through the use of a computer implemented process. An application server 104 provides developers with access to a user interface that allows for the creation of configuration files. Users 102*a-f* can identify the type of configuration file that they want to create and provide necessary details. The application server 104 generates the necessary configuration file and distributes the generated file to the appropriate computer systems 106*a-d*.

The users 102*a-f* can access the user interface over a network (for example a local area network, a virtual private network, or the Internet). The user interface can be part of a custom client/server application or can be a webpage distributed by a Web server working in conjunction with the application server 104.

In general, the users 102*a-f* may have a variety of different roles in the organization. For example, an application developer may create a particular application which requires a configuration file. A database administrator may create system configuration access to databases. A systems engineer or architect may configure executable environments, such as a J2EE sever like WEBSPHERE. In some implementations, different users may have access to different types of available configuration files based on their role in the organization.

Figure 2:
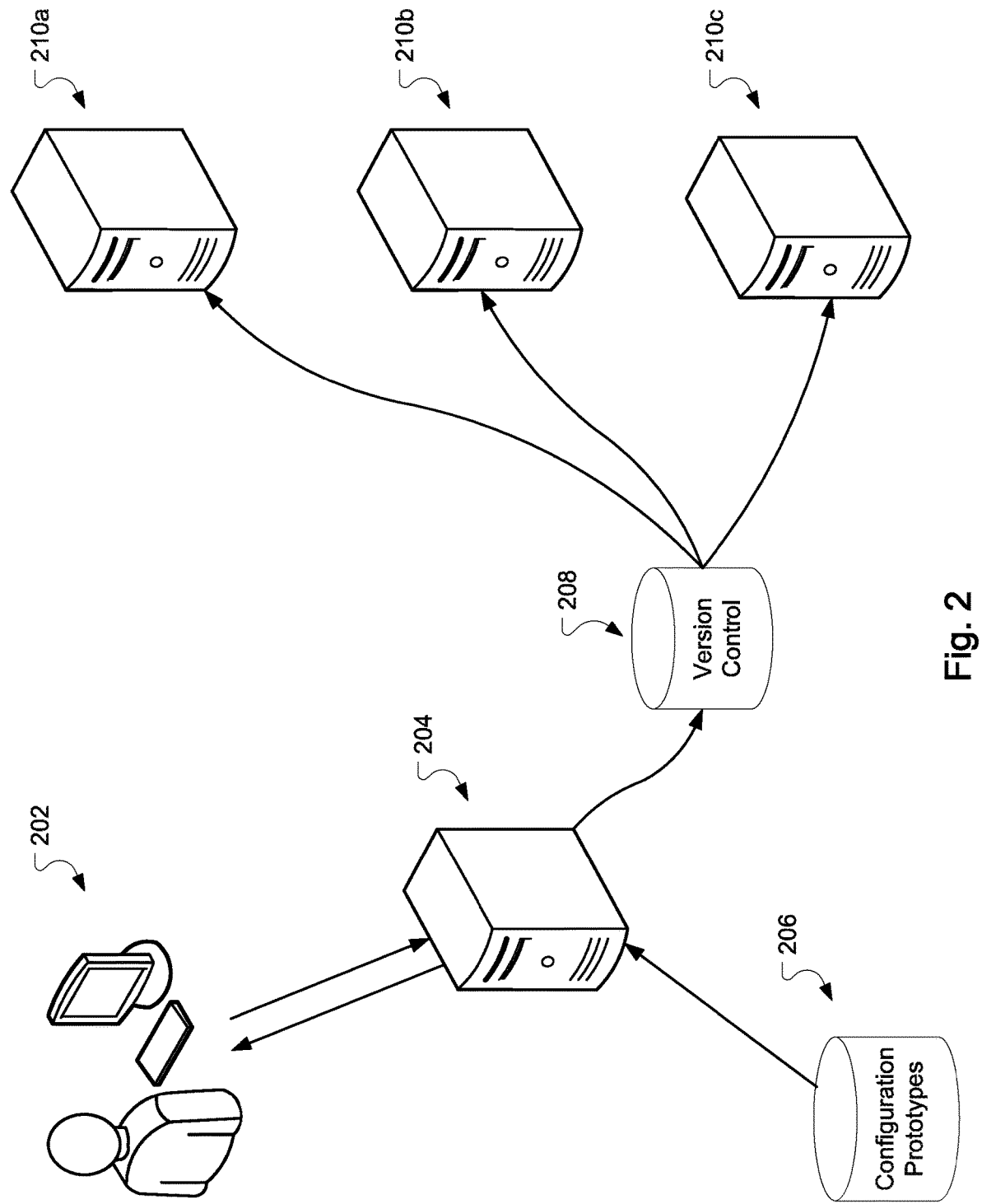
FIG. 2 illustrates an example of a user generating a configuration file.

FIG. 2 illustrates an example of a user generating a configuration file. A user operating a computer system 202 can access an application server 204. The application server can be, for example, a Web server responsive to HTTP requests. The application server accesses a data store 206 which stores configuration prototypes. A configuration prototype can be a set of one or more files that can be used to generate a configuration file. The configuration prototype can include, for example, a graphical using interface component which enables a user to provide values for the configuration file and an XML schema that allows the application file to be generated. The schema can be used to generate the file via JAXB Java architecture for XML binding. The java language provides the ability to take data and create xml files from java classes (also vice versa). These classes are a representation of the XML. The application server can generate a user interface that enables the user to select one type of configuration out of the list of configuration prototypes.

The computing system 202 displays the list of configuration prototypes to the user. The user selects the type of configuration. Each potential configuration file can be associated with an XML schema that defines the format of the configuration file. In general, an XML schema is a description that expresses constraints on the structure and content of the document. An XML schema can include information regarding the structure of the document and the data types of different elements within the document.

Each potential configuration file can also include processing logic which can be used to further validate information that will be used to generate the configuration file. For example, the potential configuration file can be associated with the Java class or other program which is used for secondary validations (for example validations that are not easily expressed in an XML schema).

Each potential configuration file can also be associated with a user interface. The user interface is configured to request and receive information from the user. The information can be validated by the processing logic and the XML schema. Once validated, the information can be used to generate the configuration file.

Once the user has selected a configuration file, the application server can obtain the processing logic in the user interface associated with the selected configuration file. The user interface can be presented to the user (for example as an HTTP form). The user interface can include prompts for information that the application server requires in order to generate a configuration file of the selected type.

The application server can validate that the information provided by the user is consistent with the requirements of the configuration file. For example, the application server executes the processing logic against the information provided by the user, generates a configuration file based on the inputs, and validates the generated configuration file against the XML schema.

Once the configuration file is generated, the application server stores the completed file in a version control system 208. From the version control system, the configuration file can be distributed to other application servers 210*a-c*. An external reference table can be used to identify where to store a configuration file. The external reference table can describe the location of where files should be stored as well as how to connect to the source code respository.

Figure 3:
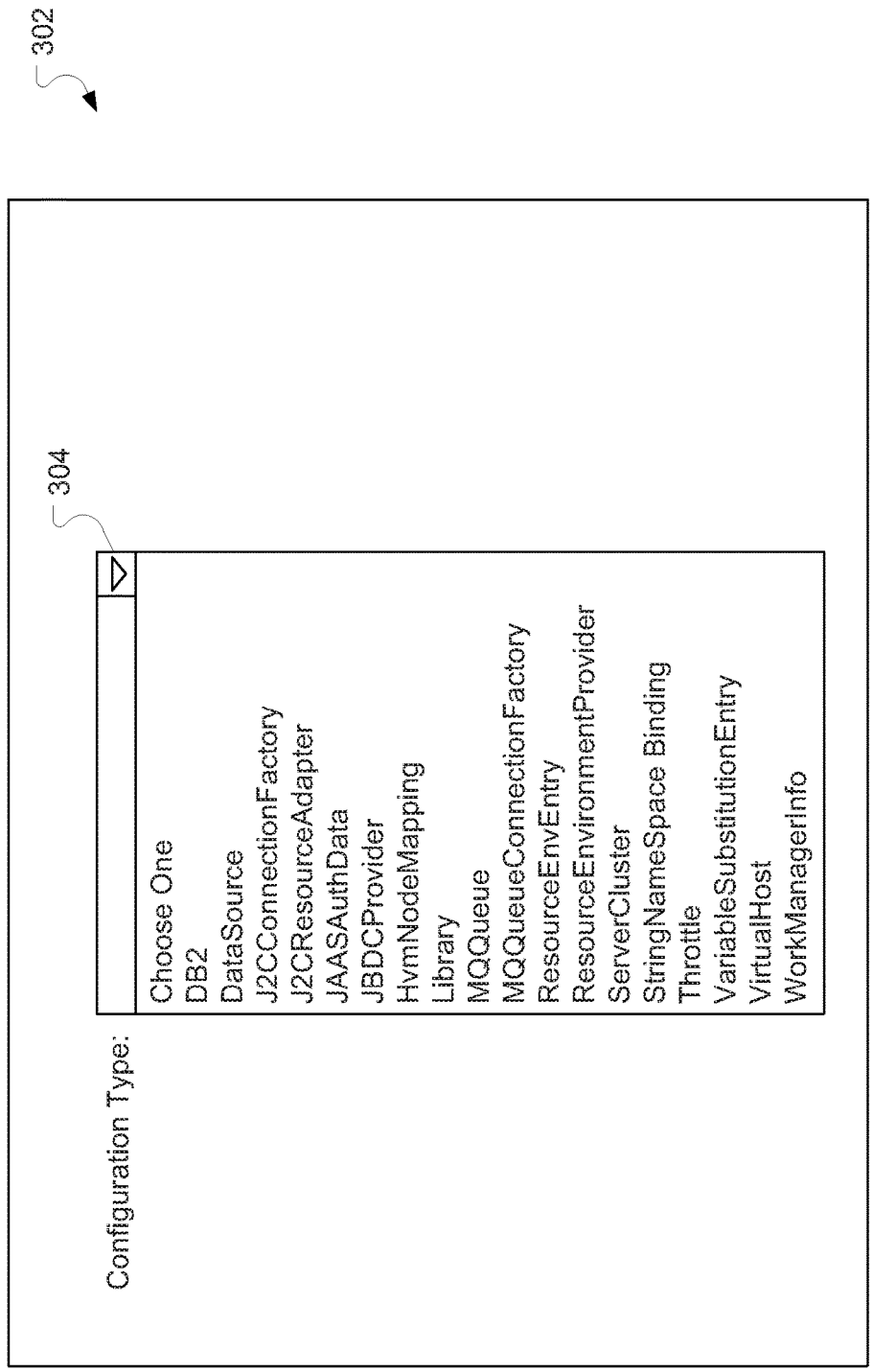
FIG. 3 illustrates an exemplary user interface for selecting a type of configuration.

FIG. 3 illustrates an exemplary user interface 302 for selecting a type of configuration. The user interface 302 can be presented to a user (for example the user 202 of FIG. 2). User interface 302 presents the different types of configurations that the system is capable of generating. The list of configurations can be dynamically generated based on information stored in a data store (for example, the data store 206 of FIG. 2). The user is able to select one of the configurations from the list 304.

Once a configuration prototype is selected, the application server can provide a user interface that is customized for the particular configuration file. FIG. 4 illustrates an exemplary user interface for providing data for a configuration file. The user interface 400 can include fields that allow a user to supply data for a configuration file. The fields can allow for text entry (for example the author data alias field, the description field 412, the JNDI name field 414, the name field 416, the JDBC provider field 418, the max connections field 122, the database name field or hundred 26, the driver type field the 428, and the server name field 430).

In this example, the configuration type field 402 displays the type of configuration file to be generated, as this field was determined by the previous user interface (the user interface 300 of FIG. 3); this field is not editable.

In some scenarios, the values that the user may enter into a field may be limited (for example, the author mechanism field 406 may limit the possible selections by using a drop-down list box). The container persistence field 408 is a checkbox that allows the user to select checked to represent a true value or unchecked to represent a false value. Other types of user controls may be used (for example, a combination box from a pre-determined list of options or enter in their own data or a radio box that allows the user to select from a predetermined set of options). In some scenarios, a preferred choice may be prepopulated in the user interface. For example, the container persistence field may be checked or unchecked by default.

Once the user is satisfied with the information provided in the field, the user may submit the configuration file for verification by pressing a submit button 432 or submitting to another similar mechanism.

Once the configuration file is submitted, it may be verified by an application server. For example, the application server may verify that the data entered into the fields is consistent with the allowable data types. In some implementations, scripts or other executable code executing on the user interface 400 may prohibit the entry of a validation (for example, if a particular field accepts only numerical data, such as the max connections field 422, then a script executing on the user interface may raise an error on or prevent the entry of non-numerical data).

The system may generate a configuration file using an XML schema. FIG. 5 illustrates an example of an XML schema.

An XML schema 500 is a description of a type of XML document, typically expressed in terms of constraints on the structure and content of documents of that type, above and beyond the basic syntactical constraints imposed by XML itself. These constraints are generally expressed using some combination of grammatical rules governing the order of elements, Boolean predicates that the content must satisfy, data types governing the content of elements and attributes, and more specialized rules such as uniqueness and referential integrity constraints.

There are languages developed specifically to express XML schemas. The Document Type Definition (DTD) language, which is native to the XML specification, is a schema language that is of relatively limited capability, but that also has other uses in XML aside from the expression of schemas. Two more expressive XML schema languages in widespread use are XML Schema (with a capital S) and RELAX NG.

The mechanism for associating an XML document with a schema varies according to the schema language. The association may be achieved via markup within the XML document itself, or via some external means.

The schema 500 is defined using the XML Schema Definition Language (XSD). XSD is a language that can be used to express rules to which an XML document must conform. XSD further enables the definition of data types that are required in order to be considered valid.

In this example, the schema includes a high level element for each type of configuration file that can be generated. For example, the schema includes a "db2" element 502, and a data source element 504. The schema can also use other element types (for example, the connection pool element 510 is not a configuration type but is a substructure that can be used by multiple different configuration files). The data source element 504 includes a reference 506 to the connection pool element 510.

Sub-elements in the schema 500 can reference different fields of the configuration file to be generated. In this example, the datasourceHelperClassname data element 508 corresponds to the Data Source Helper field 410 of FIG. 4. The datasourceHelperClassname data element 508 includes a type attribute that indicates that the Data Source Helper field 410 may only accept strings as input.

As described above, the data source data element 504 includes a reference to the reference 506 to the connection pool element 510. The maxConnections element 512 of the connectionPool data element 510 corresponds to the Max Connections field 422 of the user interface 400 of FIG. 4. The maxConnections element 512 includes a type attribute 516 that indicates that the Max Connections field 422 of FIG. 4 may only accept integers as input.

FIG. 6 is an exemplary configuration file 600 generated using the user interface 400 of FIG. 4 and the schema 500 of FIG. 5. The XML configuration file includes values provided by the user interface 400 of FIG. 4. The XML configuration file can also include default values or values that are predetermined. In some scenarios, the user of the user interface 400 may not be able to change all of the values.

In this example, the values for the data source element 602 of the configuration file 600 can be taken from the auth data alias field 404, auth mechanism field 406, the container persistence field 408, the data source helper class 410, the description field 412, the JNDI name field 414, the name field 418, and the JDBC provide field 418.

The values for the connection pool element 604 can be taken from the Max Connections field 422.

The values for the resource properties elements 608, 610, 612 can be taken from the database name field 426, the driver type field 428, and the server name field 430 respectively.

In some implementations, the user interface may be able to load an existing configuration file for editing. For example, the user interface may be able to obtain a configuration file from the code repository, identify the location of the values corresponding to the fields on the user interface, and populate the user interface with values from the configuration file. The application server may perform an exclusive lock, or check out, operation on the source code repository to ensure that multiple users are not attempting to modify the configuration file simultaneously before presenting the user interface to a user. Once the configuration file is edited, the application server may update the configuration file and release the exclusive lock (for example, using a check in procedure). The user interface can allow a configuration file to be changed by changing the values of drop downs. When a user indicates that the changes to the configuration file are complete the configuration file can be updated to reflect the values in the fields of the user interface.

Embodiments of the subject matter and the functional operations described in this specification can be implemented in digital electronic circuitry, in tangibly-embodied computer software or firmware, in computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry (e.g., an FPGA (field programmable gate array) or an ASIC (application-specific integrated circuit)). The apparatus can optionally include, in addition to hardware, code that creates an execution environment for computer programs (e.g., code that constitutes processor firmware, a protocol stack, a database management system, an operating system, or a combination of one or more of them).

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device (e.g., a mobile telephone, a personal digital assistant (PDA), a mobile audio or video player, a game console, a Global Positioning System (GPS) receiver), or a portable storage device (e.g., a universal serial bus (USB) flash drive), to name just a few.

Computer-readable media suitable for storing computer program instructions and data include all forms of non-volatile memory, media and memory devices, including by way of example, semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input. In addition, a computer can interact with a user by sending documents to and receiving documents from a device that is used by the user (for example, by sending web pages to a web browser on a user's device in response to requests received from the web browser).

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device, which acts as a client). Data generated at the user device (e.g., a result of the user interaction) can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method comprising:
presenting a first user interface to a user, the first user interface including a user selectable list of a plurality of configuration types, each configuration type associated with a preexisting XML schema;

receiving, through the first user interface, a selection of a particular configuration type from the user selectable list of the plurality of configuration types;

responsive to receiving the selection, presenting a second user interface to the user, the second user interface including a plurality of fields;

receiving, from a user through the second user interface, a plurality of values, at least a portion of the plurality of values being entered by the user into at least one field of the plurality of fields;

generating a configuration file for an application based on the plurality of values and the preexisting XML schema associated with the selected particular configuration type, wherein generating the configuration file comprises:

identifying a plurality of elements in the preexisting XML schema associated with the selected particular configuration type, each element including attributes, identifying at least one attribute corresponding to a value, the at least one attribute defining at least one property of the element, and adding the value to a configuration file associated with the at least one attribute; and distributing the configuration file to a plurality of different computers, each computer having the application installed.

2. The method of claim 1, further comprising:
adding the generated configuration file to a source code management system.

3. The method of claim 1, further comprising:
validating the plurality of values based on the preexisting XML schema associated with the selected particular configuration type using a validation program.

4. The method of claim 1, wherein the preexisting XML schema associated with the selected particular configuration type defines a structure of the configuration file and a data type for values in the configuration file.

5. The method of claim 1, further comprising:
obtaining a stored configuration file;
presenting a third user interface to the user, the third user interface including a second plurality of fields, at least some of the second plurality of fields populated based on values in the stored configuration file;
receiving an update to a value in a field of the third user interface; and
updating the stored configuration file based on the updated value.

6. A non-transitory computer storage medium encoded with computer program instructions that when executed by one or more computers cause the one or more computers to perform operations comprising:

presenting a first user interface to a user, the first user interface including a user selectable list of a plurality of configuration types, each configuration type associated with a preexisting XML schema;

receiving, through the first user interface, a selection of a particular configuration type from the user selectable list of the plurality of configuration types;

responsive to receiving the selection, presenting a second user interface to the user, the second user interface including a plurality of fields;

receiving, from the user through the second user interface, a plurality of values, at least a portion of the plurality of values being entered by the user into at least one field of the plurality of fields;

generating a configuration file for an application based on the plurality of values and the preexisting XML schema associated with the selected particular configuration type, wherein generating the configuration file comprises:

identifying a plurality of elements in the preexisting XML schema associated with the selected particular configuration type, each element including attributes, identifying at least one attribute corresponding to a value, the at least one attribute defining at least one property of the element, and adding the value to a configuration file associated with the attribute; and distributing the configuration file to a plurality of different computers, each computer having the application installed.

7. The medium of claim 6, the operations further comprising:
adding the generated configuration file to a source code management system.

8. The medium of claim 6, the operations further comprising:
validating the plurality of values based on the preexisting XML schema associated with the selected particular configuration type using a validation program.

9. The medium of claim 6, wherein the preexisting XML schema associated with the selected particular configuration type defines a structure of the configuration file and a data type for values in the configuration file.

10. The medium of claim 6, the operations further comprising:
obtaining a stored configuration file;
presenting a third user interface to the user, the third user interface including a second plurality of fields, at least some of the second plurality of fields populated based on values in the stored configuration file;
receiving an update to a value in a field of the third user interface; and
updating the stored configuration file based on the updated value.

11. A system comprising:
at least one processor; and
a data store coupled to the at least one processor having instructions stored thereon which, when executed by the at least one processor, causes the at least one processor to perform operations comprising:

presenting a first user interface to a user, the first user interface including a user selectable list of a plurality of configuration types, each configuration type associated with a preexisting XML schema;

receiving, through the first user interface, a selection of a particular configuration type from the user selectable list of the plurality of configuration types;

responsive to receiving the selection, presenting a second user interface to the user, the second user interface including a plurality of fields;

receiving, from a user through the second user interface, a plurality of values, at least a portion of the plurality of values being entered by the user into at least one field of the plurality of fields;

generating a configuration file for an application based on the plurality of values and the preexisting XML schema associated with the selected particular configuration type, wherein generating the configuration file comprises:

identifying a plurality of elements in the preexisting XML schema associated with the selected particular configuration type, each element including attributes, identifying at least one attribute corresponding to a value, the at least one attribute defining at least one property of the element, and adding the value to a configuration file associated with the attribute; and distributing the configuration file to a plurality of different computers, each computer having the application installed.

12. The system of claim 11, the operations further comprising:

adding the configuration file to a source code management system.

13. The system of claim 11, the operations further comprising:

validating the plurality of values based on the preexisting XML schema associated with the selected particular configuration type using a validation program.

14. The system of claim 11, wherein the preexisting XML schema associated with the selected particular configuration type defines a structure of the configuration file and a data type for values in the configuration file.

15. The system of claim 11, the operations further comprising:

obtain a stored configuration file;

present a third user interface to the user, the third user interface including a second plurality of fields, at least some of the second plurality of fields populated based on values in the stored configuration file;

receive an update to a value in a field of the third user interface; and update the stored configuration file based on the updated value.

* * * * *